(12) United States Patent
Wagner et al.

(10) Patent No.: US 8,875,129 B2
(45) Date of Patent: Oct. 28, 2014

(54) SYSTEMS AND METHODS FOR MONITORING AND ALERTING EVENTS THAT VIRTUAL MACHINE SOFTWARE PRODUCES IN A VIRTUAL INFRASTRUCTURE

(75) Inventors: Andrew Wagner, Portland, OR (US); Chyna Trople, Portland, OR (US); Robert DiFalco, Portland, OR (US)

(73) Assignee: Tripwire, Inc., Portland, OR (US)

( * ) Notice: Subject to any disclaimer, the term of this patent is extended or adjusted under 35 U.S.C. 154(b) by 423 days.

(21) Appl. No.: 12/701,493

(22) Filed: Feb. 5, 2010

(65) Prior Publication Data

US 2011/0197205 A1 Aug. 11, 2011

(51) Int. Cl.
G06F 9/455 (2006.01)
G06F 15/173 (2006.01)
G06F 11/00 (2006.01)
G06F 9/54 (2006.01)

(52) U.S. Cl.
CPC ..................................... *G06F 9/542* (2013.01)
USPC ............... 718/1; 709/223; 709/224; 709/226; 714/25; 714/37; 714/39; 714/48

(58) Field of Classification Search
USPC ................... 719/318; 709/223, 224
See application file for complete search history.

(56) References Cited

U.S. PATENT DOCUMENTS

| | | | |
|---|---|---|---|
| 5,493,729 A * | 2/1996 | Nigawara et al. | ................ 706/52 |
| 5,828,830 A | 10/1998 | Rangaraian et al. | |
| 6,006,016 A * | 12/1999 | Faigon et al. | ................... 714/48 |
| 6,112,225 A | 8/2000 | Kraft et al. | |
| 6,182,119 B1 | 1/2001 | Chu | |
| 6,182,249 B1 | 1/2001 | Wookey et al. | |
| 6,282,175 B1 | 8/2001 | Steele et al. | |
| 6,629,106 B1 * | 9/2003 | Narayanaswamy et al. | .......... 1/1 |
| 6,938,081 B1 | 8/2005 | Mir | |
| 6,941,557 B1 * | 9/2005 | Jakobson et al. | ............. 719/316 |
| 7,028,228 B1 | 4/2006 | Lovy et al. | |
| 7,243,348 B2 | 7/2007 | Good et al. | |
| 7,287,193 B2 | 10/2007 | Ward | |
| 7,316,016 B2 | 1/2008 | DiFalco et al. | |
| 7,337,090 B1 * | 2/2008 | Yemini et al. | ................. 702/183 |
| 7,360,099 B2 | 4/2008 | DiFalco et al. | |
| 7,469,287 B1 * | 12/2008 | Castillo et al. | ................ 709/224 |
| 7,490,322 B2 | 2/2009 | Pichetti et al. | |
| 7,587,754 B2 | 9/2009 | DiFalco et al. | |
| 7,620,715 B2 | 11/2009 | DiFalco et al. | |
| 7,711,703 B2 | 5/2010 | Smolen et al. | |
| 7,711,980 B1 | 5/2010 | Scarpello, Jr. et al. | |
| 7,765,460 B2 | 7/2010 | DiFalco et al. | |
| 7,822,724 B2 | 10/2010 | DiFalco et al. | |
| 7,860,222 B1 | 12/2010 | Sidler et al. | |
| 8,031,634 B1 * | 10/2011 | Artzi et al. | .................... 370/254 |
| 8,140,635 B2 | 3/2012 | Difalco | |
| 8,140,919 B2 | 3/2012 | Glaser et al. | |

(Continued)

OTHER PUBLICATIONS

Non-final Office Action dated Jul. 18, 2011, in U.S. Appl. No. 12/701,491, 15 pages.

(Continued)

*Primary Examiner* — Charles Swift
(74) *Attorney, Agent, or Firm* — Klarquist Sparkman, LLP

(57) ABSTRACT

Embodiments of the present disclosure provide methods and systems for generating an alert based upon detection of a pattern of events within a virtual infrastructure. Other embodiments may be described and claimed.

33 Claims, 5 Drawing Sheets

(56) References Cited

U.S. PATENT DOCUMENTS

| | | |
|---|---|---|
| 8,176,158 B2 | 5/2012 | Difalco et al. |
| 8,364,639 B1 | 1/2013 | Koryakina et al. |
| 2002/0078382 A1 | 6/2002 | Sheikh et al. |
| 2002/0112078 A1 | 8/2002 | Yach |
| 2003/0037089 A1 | 2/2003 | Cota-Robles et al. |
| 2004/0024843 A1 | 2/2004 | Smith |
| 2004/0122962 A1 | 6/2004 | DiFalco et al. |
| 2004/0128670 A1* | 7/2004 | Robinson et al. ............. 718/1 |
| 2004/0172574 A1* | 9/2004 | Wing et al. ................... 714/4 |
| 2005/0050068 A1 | 3/2005 | Vaschillo et al. |
| 2005/0137832 A1* | 6/2005 | Yemini et al. ............. 702/183 |
| 2006/0041659 A1* | 2/2006 | Hasan et al. ............... 709/224 |
| 2006/0161879 A1 | 7/2006 | Lubrecht et al. |
| 2006/0242277 A1 | 10/2006 | Torrence et al. |
| 2006/0262915 A1 | 11/2006 | Marascio et al. |
| 2007/0028237 A1 | 2/2007 | Bulson et al. |
| 2007/0043786 A1 | 2/2007 | DiFalco et al. |
| 2007/0043860 A1 | 2/2007 | Pabari |
| 2007/0124255 A1 | 5/2007 | DiFalco et al. |
| 2007/0130566 A1 | 6/2007 | van Rietschote et al. |
| 2007/0174449 A1* | 7/2007 | Gupta ........................... 709/224 |
| 2007/0283348 A1* | 12/2007 | White ............................ 718/1 |
| 2007/0299882 A1 | 12/2007 | Padgett et al. |
| 2007/0300218 A1 | 12/2007 | Mann |
| 2008/0114581 A1* | 5/2008 | Meir et al. .................... 703/13 |
| 2008/0114874 A1* | 5/2008 | Meir et al. ................... 709/224 |
| 2008/0134050 A1 | 6/2008 | Franceschelli et al. |
| 2008/0134175 A1 | 6/2008 | Fitzgerald et al. |
| 2008/0163207 A1* | 7/2008 | Reumann et al. ............. 718/1 |
| 2008/0163211 A1 | 7/2008 | Mizuno |
| 2008/0178249 A1 | 7/2008 | Gordon et al. |
| 2008/0222375 A1 | 9/2008 | Kotsovinos et al. |
| 2008/0256533 A1* | 10/2008 | Ben-Yehuda et al. ......... 718/1 |
| 2009/0037492 A1 | 2/2009 | Baitalmal et al. |
| 2009/0094336 A1 | 4/2009 | Echevarria et al. |
| 2009/0094584 A1 | 4/2009 | Dheap et al. |
| 2009/0138541 A1 | 5/2009 | Wing et al. |
| 2009/0177710 A1 | 7/2009 | Holenstein et al. |
| 2009/0199177 A1 | 8/2009 | Edwards et al. |
| 2009/0287818 A1 | 11/2009 | Tachibana et al. |
| 2009/0292948 A1* | 11/2009 | Cinato et al. .................. 714/26 |
| 2009/0300578 A1 | 12/2009 | Neil |
| 2010/0005107 A1 | 1/2010 | DiFalco |
| 2010/0017519 A1* | 1/2010 | Han et al. .................... 709/227 |
| 2010/0023612 A1 | 1/2010 | Yoshida et al. |
| 2010/0049929 A1 | 2/2010 | Nagarkar |
| 2010/0100955 A1 | 4/2010 | Young et al. |
| 2010/0175063 A1* | 7/2010 | Ciano et al. ..................... 718/1 |
| 2010/0191887 A1 | 7/2010 | Serebrin |
| 2010/0242045 A1 | 9/2010 | Swamy et al. |
| 2010/0275199 A1* | 10/2010 | Smith et al. ..................... 718/1 |
| 2011/0004914 A1* | 1/2011 | Ennis et al. ..................... 726/1 |
| 2011/0032260 A1 | 2/2011 | Duggan et al. |
| 2011/0055385 A1 | 3/2011 | Tung et al. |
| 2011/0119670 A1* | 5/2011 | Sugumar et al. ................ 718/1 |
| 2011/0137905 A1 | 6/2011 | Good et al. |
| 2011/0138038 A1 | 6/2011 | Good et al. |
| 2011/0138039 A1 | 6/2011 | Good et al. |
| 2011/0197094 A1 | 8/2011 | Wagner |
| 2011/0197189 A1 | 8/2011 | Wagner et al. |
| 2012/0023076 A1 | 1/2012 | Torrence et al. |
| 2012/0137293 A1* | 5/2012 | Bozek et al. ..................... 718/1 |
| 2012/0179805 A1 | 7/2012 | DiFalco |

OTHER PUBLICATIONS

Final Office Action dated Nov. 25, 2011, in U.S. Appl. No. 12/701,491, 18 pages.
Non-final Office Action dated Oct. 2, 2012, in U.S. Appl. No. 12/701,491, 17 pages.
Non-final Office Action dated Jul. 19, 2012, in U.S. Appl. No. 12/701,492, 17 pages.
Final Office Action dated Jan. 11, 2013, in U.S. Appl. No. 12/701,492 (published as U.S. Patent Publication No. 2011/0197189), 13 pages.
Final Office Action dated May 30, 2013, for U.S. Appl. No. 12/701,491 (published as U.S. Patent Publication No. 2011/0197094), 16 pages.
Notice of Allowance dated Aug. 20, 2013, in U.S. Appl. No. 12/701,492.
Non-Final Office Action dated Jan. 9, 2014, in U.S. Appl. No. 12/701,491, 17 pp.

* cited by examiner

SYSTEMS AND METHODS FOR MONITORING AND ALERTING EVENTS THAT VIRTUAL MACHINE SOFTWARE PRODUCES IN A VIRTUAL INFRASTRUCTURE

TECHNICAL FIELD

Embodiments of the present disclosure relate to the field of data processing, and more particularly, to detecting and correlating log events, configuration changes and conditions producing alerts within a virtual infrastructure.

BACKGROUND

Advances in microprocessor and related technologies have led to wide spread deployment and adoption of numerous general purpose as well as special purpose computing devices. General purpose computing devices, such as servers and desktop computers, are now endowed with computing power that was once reserved for the most expensive high end computers, requiring a special conditioned environment to operate. At the same time, special purpose computing devices such as personal digital assistants, media players, wireless mobile phones are common. Further, advances in networking, telecommunication, satellite, and other related technologies have also led to increase in connectivity between computing devices, making possible networked computing over private and/or public networks, such as the Internet.

However, as networked computing continues to grow in sophistication, enterprise networks become increasingly complex. Many networks are now partitioned to include one or more virtual infrastructures. VMware® software, available from VMware®, Inc., may be used to provide the one or more virtual infrastructures and provides a completely virtualized set of hardware to a guest operating system. VMware® software virtualizes the hardware for a video adapter, a network adapter, and hard disk adapters. The host provides pass-through drivers for guest USB, serial, and parallel devices. In this way, VMware® virtual machines become highly portable between computers, because the guests have no knowledge of the host on which they are running. In practice, a system administrator can pause operations on a virtual machine guest, move or copy that guest to another physical computer, and there resume execution exactly at the point of suspension. Alternately, for enterprise servers, a feature called VMotion allows the migration of operational guest virtual machines between similar but separate hardware hosts sharing the same storage. Each of these transitions is completely transparent to any users on the virtual machine at the time it is being migrated.

From configuration, application service provision, change management, to network protection, enterprises currently face many challenges.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of the disclosure are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present disclosure.

For the purposes of the present disclosure, the phrase "A/B" means A or B. For the purposes of the present disclosure, the phrase "A and/or B" means "(A), (B), or (A and B)". For the purposes of the present disclosure, the phrase "at least one of A, B, and C" means "(A), (B), (C), (A and B), (A and C), (B and C), or (A, B and C)". For the purposes of the present disclosure, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As is known in the art, many network computing systems are configured using virtualization technology. Thus, many processing devices and/or processing systems may be virtually configured such that they operate as multiple independent systems. Generally, the systems are arranged to include at least one virtual machine, as well as one or more virtual objects that may function or operate in a manner similar to a physical peripheral device, for example, a CD Rom, a floppy disk drive, etc. The virtual machines generally function as the processor and/or controller within the virtual system. Each virtual system may include one or more virtual machines that may operate independently of each other and/or some of the virtual machines may run interdependently.

Figure 1A:
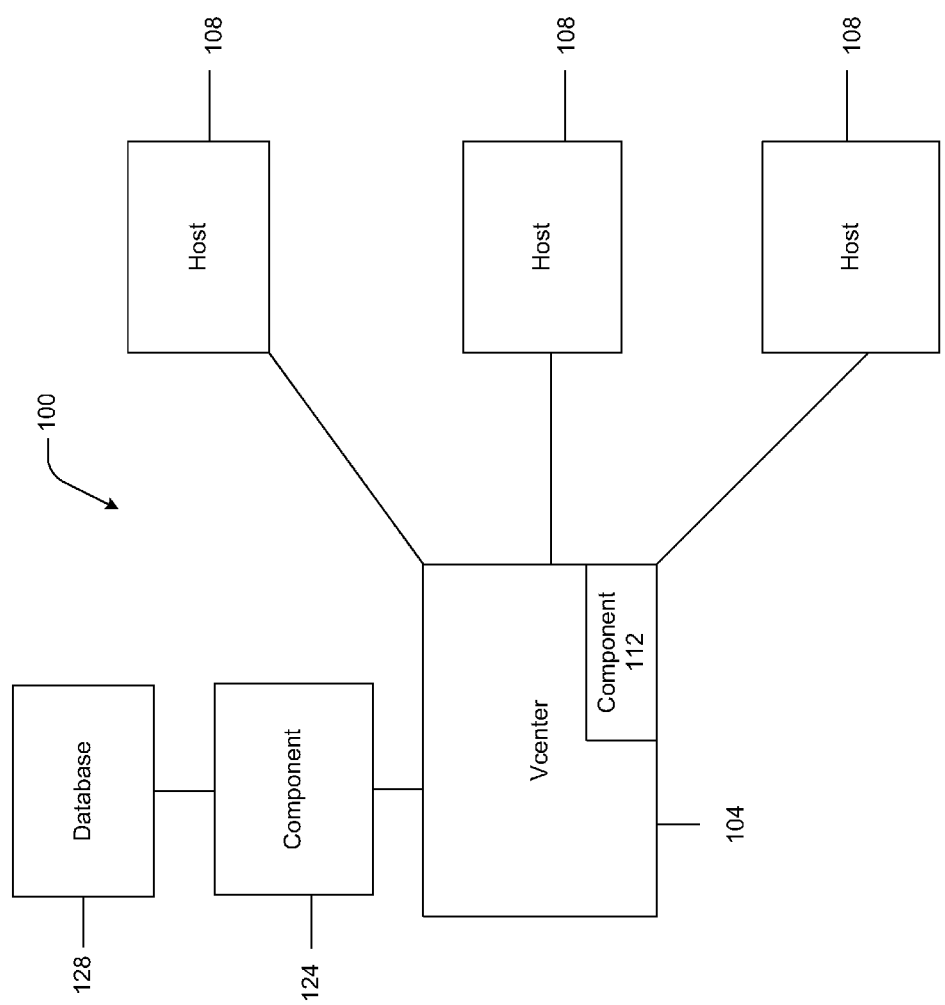
FIG. 1A schematically illustrates a network configured with a virtual infrastructure.

FIG. 1A schematically illustrates a network 100 that includes a virtual center (vCenter) 104 and a plurality of hosts 108. The vCenter 104 includes a component 112 that provides intra-partitioning of the hosts 108 into one or more virtual infrastructures. The vCenter is a VMware® server that is used to control one or more hosts 108. The component 112 may be in the form of software or firmware. In some embodiments, the component 112 may be a supervisory-level component, e.g., a kernel component. In various embodiments, a kernel component may be services (e.g., loader, scheduler, memory manager, etc.), extensions/drivers (e.g., for a network card, a universal serial bus (USB) interface, a disk drive, etc.), or a service-driver hybrid (e.g., intrusion detectors to watch execution of code).

As used herein, the term "component" is intended to refer to programming logic and associated data that may be employed to obtain a desired outcome. The term component may be synonymous with "module" or "agent" and may refer to programming logic that may be embodied in hardware or firmware, or in a collection of software instructions, possibly having entry and exit points, written in a programming language, such as, for example, C++, Intel Architecture 32 bit (IA-32) executable code, etc.

A software component may be compiled and linked into an executable program, or installed in a dynamic link library, or may be written in an interpretive language such as BASIC. It will be appreciated that software components may be callable from other components or from themselves, and/or may be invoked in response to detected events or interrupts. Software instructions may be provided in a machine accessible medium, which when accessed, may result in a machine performing operations or executions described in conjunction with components of embodiments of the present disclosure. Machine accessible medium may be firmware, e.g., an electrically erasable programmable read-only memory (EEPROM), or other recordable/non-recordable medium, e.g., read-only memory (ROM), random access memory (RAM), magnetic disk storage, optical disk storage, etc. It will be further appreciated that hardware components may be comprised of connected logic units, such as gates and flip-flops, and/or may be comprised of programmable units, such as programmable gate arrays or processors. In some embodiments, the components described herein are implemented as software modules, but nonetheless may be represented in hardware or firmware. Furthermore, although only a given number of discrete software/hardware components may be illustrated and/or described, such components may nonetheless be represented by additional components or fewer components without departing from the spirit and scope of embodiments of the disclosure.

Figure 1B:
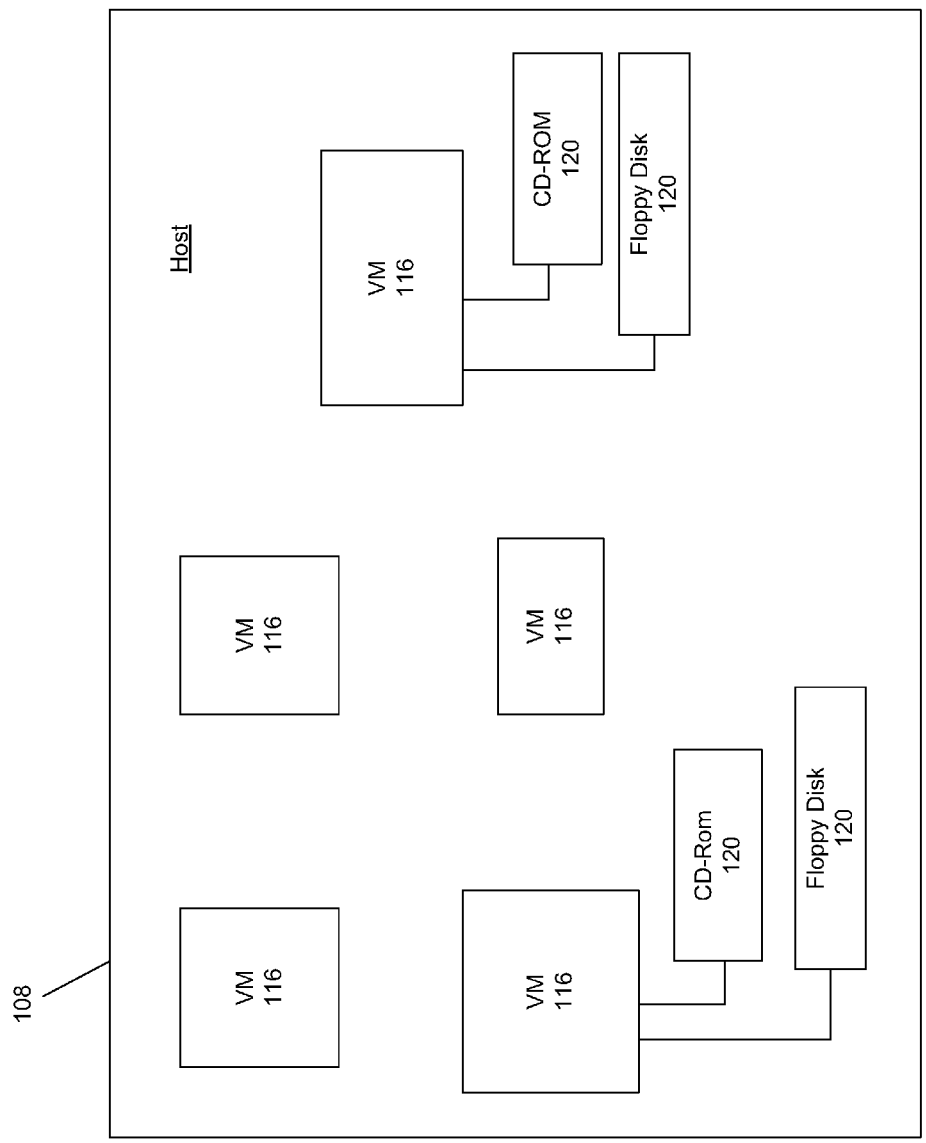
FIG. 1B schematically illustrates a host, configured with a virtual infrastructure, from the network of FIG. 1A.

With reference to FIG. 1B, a host 108 may be configured by the component 112 of FIG. 1A to include one or more virtual machines 116. Virtual objects 120 may also be configured and linked to one or more corresponding virtual machine(s) 116. As previously noted, each virtual machine 116, and any associated virtual objects 120, may operate independently, or may operate interdependently. Virtual objects 120 may also be associated with more than one VM 116. As examples of virtual objects, CD-ROMs and Floppy Disks are illustrated in FIG. 1B.

Figure 2:
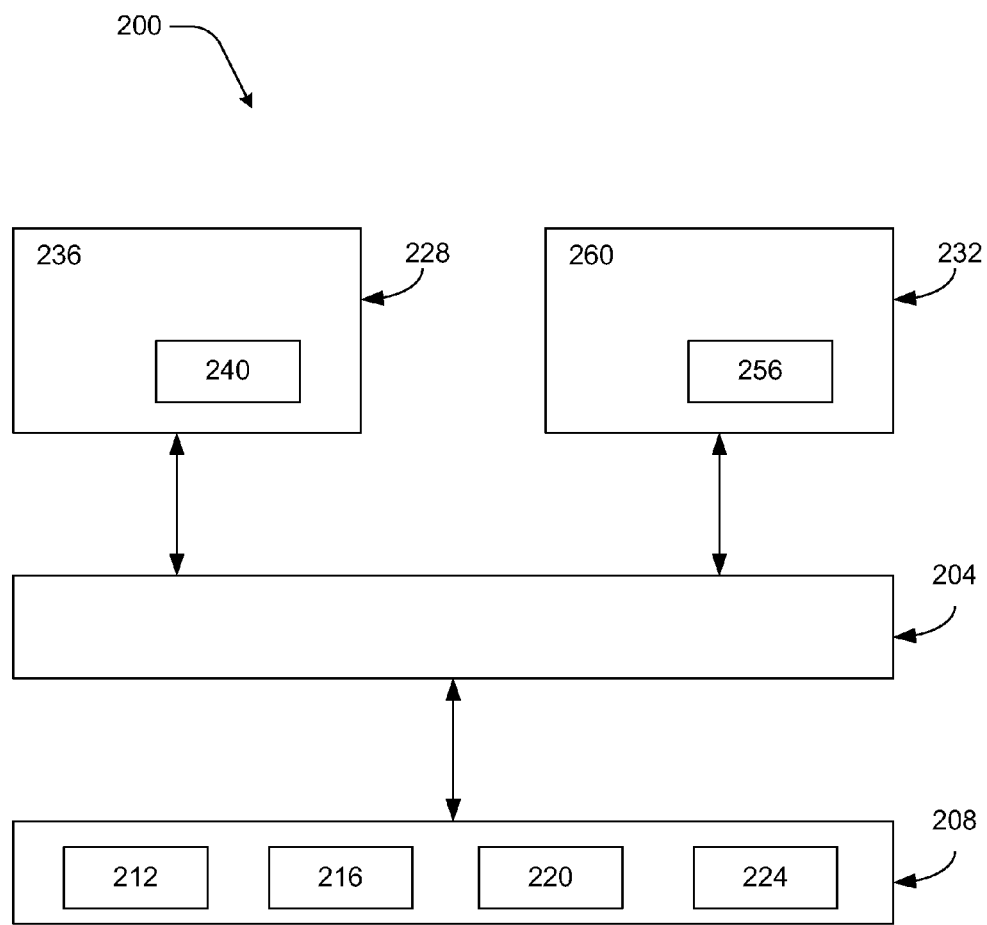
FIG. 2 schematically illustrates a platform utilizing parallel execution environments for the host of FIG. 1B.

More particularly, FIG. 2 illustrates a platform 200 wherein virtualization via, for example, VMware®, is utilized to provide parallel execution environments within the hosts 108. FIG. 2 illustrates one example for one host. In this exemplary embodiment, a management module, e.g., virtual machine monitor (VMM) 204, on the platform 200 may present multiple abstractions and/or views of the platform hardware 208, e.g., one or more processor(s) 212, network interface controller 216, storage 220, and/or memory 224, to the one or more independently operating execution environments, or "virtual machines (VMs)," e.g., first VM 228 and second VM 232. The first VM 228 may include an OS 236 and component 240, while the second VM 232 may include an OS 260 and component 256. The first VM 232 may be configured to execute code independently and securely isolated from the second VM 228 and may prevent components of the first VM 228 from performing operations that would alter, modify, read, or otherwise affect the components of the second VM 232. As previously discussed, the first VM 232 may be configured to execute code interdependently with the second VM 228 and may allow components of the first VM 228 to perform operations that would alter, modify, read, or otherwise affect the components of the second VM 232. While the platform 200 shows two VMs, other embodiments may employ any number of VMs.

The components operating in the first VM 228 and second VM 232 may each operate as if they were running on a dedicated computer rather than a virtual machine. That is, components 240 and 256 operating in the first VM 228 and second VM 232, respectively, may each expect to control various events and have complete access to hardware 208. The VMM 204 may manage VM access to the hardware 208. The VMM 204 may be implemented in software (e.g., as a stand-alone program and/or a component of a host operating system), hardware, firmware, and/or any combination thereof.

Thus, FIG. 1A illustrates a network 100 configured with a virtual infrastructure made up of at least one vCenter 104 and one or more hosts 108 that are configured to include virtual infrastructures made up of one or more virtual machines 116 and one or more virtual objects 120 as illustrated in FIG. 1B.

As with any type of network, it is important to maintain the integrity of the network and its associated systems. Furthermore, various events may occur that can lead to problems within the network. Thus, it is important to monitor and manage the virtual infrastructure in order to detect events that occur that can affect the integrity and/or cause problems for the virtual infrastructure. Event occurrences include, for example, users logging into the virtual infrastructure, VMs 116 migrating from one host 108 to another host 108, VMs 116 starting up or shutting down, users modifying configurations of virtual objects or machines, etc. Another type of event that may occur includes a configuration change, wherein one or more aspects related to a configuration for the virtual infrastructure has been changed. Examples include modifications to resource allocations within a resource pool, changes to the virtualized hardware assigned to a VM, changes to the security policy of a virtual network, etc. Some event occurrences and configuration changes may cause alerts. In other instances, conditions, such as, for example the detection of snapshots that are older than a certain threshold, the detection of datastores with less than a certain threshold of free space, the detected failure of a Logical Unit Number (LUN) path, the detection of a failed vMotion, the detection of a newly created or deleted VM 116, etc, within the virtual infrastructure may also cause an alert. Another type of event includes a relationship change, which includes, for example, detection of a newly added object (CD-ROM 120) to a VM 116, a movement of a VM 116 from one host 108 to another host 108, the assignment of a host 108 to a cluster of hosts 108, etc. An alert may include some type of message to alert the system administrator as to the occurrence of the event, the configuration change and/or the conditions within the virtual infrastructure. Thus, as used herein, events generally refer to and include event occurrences, configuration changes and conditions that may cause an alert.

Accordingly, in accordance with various embodiments of the present invention, the network 100 includes a component 124 that is configured to monitor the virtual infrastructure by communicating with the vCenter 104 in order to detect events. Generally, the component 112 is configured to maintain a system log(syslog) keeping record of various events that are detected by the vCenter 104 within the virtual infrastructure. The component 124 may be located at a server that provides the vCenter 104 or may be located remotely at a different server.

In accordance with various embodiments of the present invention, instead of generating an alert for a single event, one or more pattern of events relating to at least one virtual machine 116 and/or at least one virtual object 120 may be defined. Thus, in accordance with a various embodiments, when a single event is detected by the vCenter 104, and this event is communicated to component 124, an alert may not be generated. Component 124 may wait to see if further events are then detected by the vCenter 104. If a pattern of events is detected at the vCenter 104, and thus by the component 124, then an alert may be generated by the component 124 in response to the detection of the pattern of events. An example of a type of pattern of events includes multiple events indicating a storage reset event. While a single event indicating a storage reset event might not indicate a problem, detection of multiple events within indicating a storage reset event may indicate a large-scale failure is imminent. Generally, the patterns of events are defined by users and/or system administrators of networks similar to network 100 that are made of up one or more virtual infrastructures.

Thus, in response to detection of a pattern of events within the virtual infrastructure, the component 124 is configured to generate an alert for a virtual machine 116 and/or virtual object 120 due to a pattern of events within the virtual infrastructure. The alert is generally displayed to a user or system administrator of the virtual infrastructure. The user may then remediate, with respect to an affected virtual machine 116 and/or affected virtual object 120, one or more of the events within the pattern of events that caused the alert.

In accordance with various embodiments, the component 124 may be configured such that alerts arising from various occurrences or situations within the infrastructure are correlated with a first virtual machine or object. The first virtual machine or object may then be linked with a second virtual machine or object to thereby indicate to a system administrator of the possible effects that the condition causing the alert with respect to the first virtual machine or object may have on the second virtual machine or object, even though the alert was generated for the first virtual machine or object. More particularly, in accordance with the various embodiments, a flag may be generated for an affected virtual machine 116 and/or an affected virtual object 120 in response to the detection of a pattern of events. In many instances, due to the interrelation of the virtual machines 116 and/or the virtual objects 120 within the virtual infrastructure, multiple virtual machines 116 and/or virtual objects 120 are generally affected by detected events and detected patterns of events, even though a flag may not be initially generated for all of the virtual machines 116 and/or virtual objects 120 affected by a detected event or a detected pattern of events. Thus, in accordance with various embodiments, affected virtual machines 116 and/or affected virtual objects 120 may be correlated due to the detection of one or more patterns of events, even if a flag was not initially generated for an affected machine and/or affected virtual object 120. Once a virtual machine and/or virtual object has been correlated and deemed to be affected, a flag may be generated for that particular virtual machine and/or virtual object.

In accordance with various embodiments, the component 124 may be configured to, in response to an alert, automatically remediate one or more of the events in the pattern of events with respect to any affected virtual machines 116 and/or virtual objects 120. The component 124 will also marshal any affected virtual machines 116 and/or virtual objects 120, if there are multiple affected virtual machines 116 and/or virtual objects 120.

Figure 3:
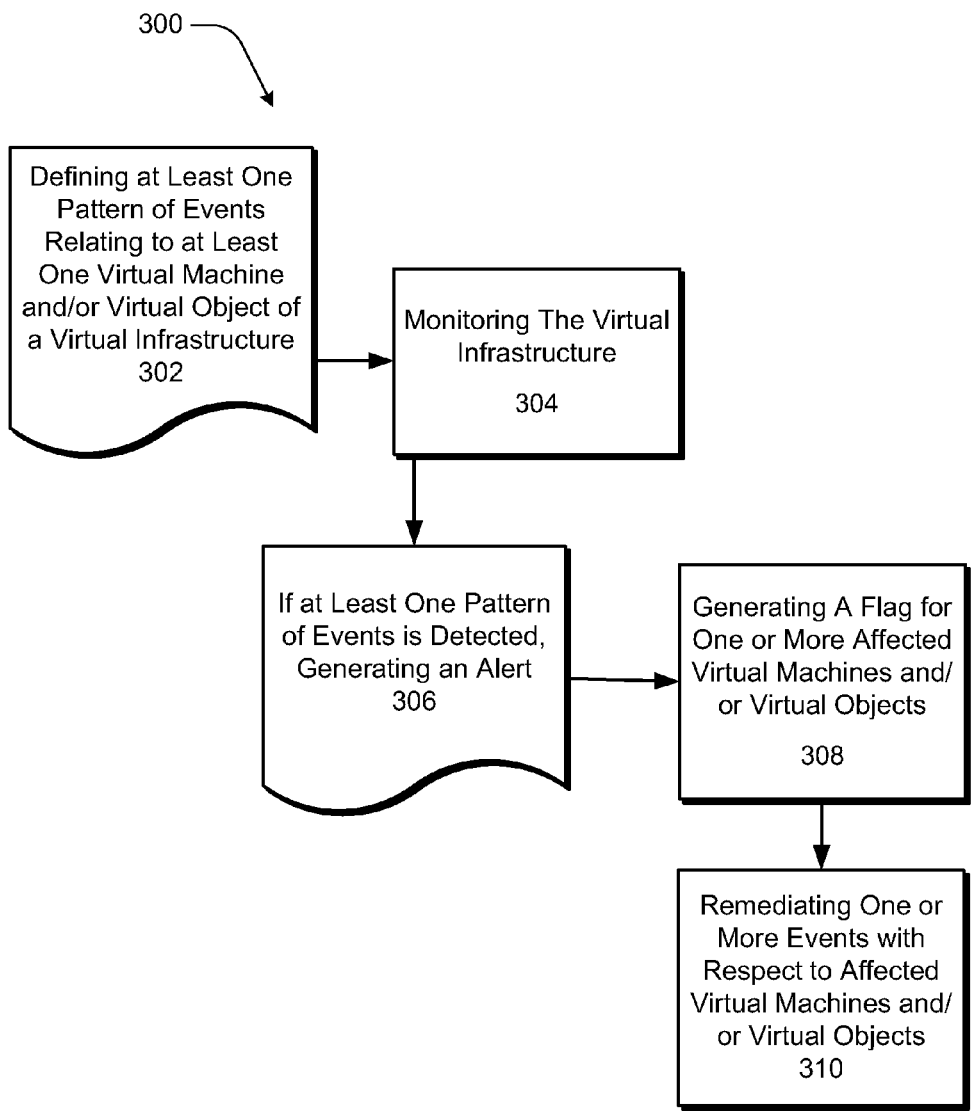
FIG. 3 is a flowchart illustrating some aspects of methods in accordance with the present disclosure.

Accordingly, with reference to FIG. 3, in accordance with various embodiments of the present invention, a method 300 of managing a virtual infrastructure comprising a plurality of virtual machines and virtual objects includes, at 302, defining at least one pattern of events relating to at least one virtual machine and/or at least one virtual object. The method 300 also includes, at 304, monitoring the virtual infrastructure. At 306, if at least one pattern of events is detected, the method 300 includes generating an alert in response to detection of the pattern of events. The method 300 may also include, at 308, generating a flag for one or more affected virtual machines and/or virtual objects due to the occurrence of the pattern of events. The method 300 may also include, at 310, remediating one or more events with respect to affected virtual machines and/or virtual objects.

Figure 4:
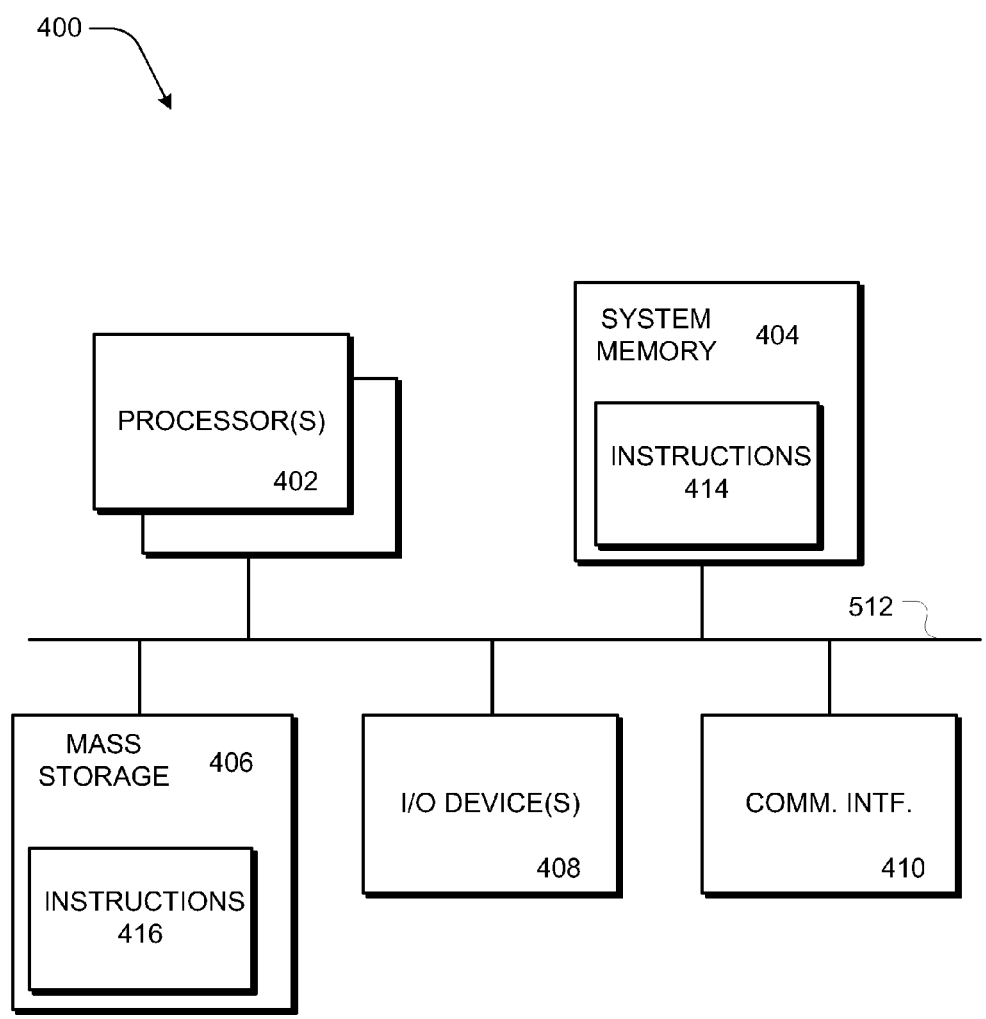
FIG. 4 schematically illustrates an example computer system suitable for use in association with a virtual infrastructure.

FIG. 4 illustrates an example computer system suitable for use in association with a virtual infrastructure, in accordance with various embodiments of this disclosure. As shown, computer system 400 may include one or more processors 402 and may include system memory 404. Additionally, computer system 400 may include mass storage 406 in the form of one or more devices (such as diskette, hard drive, compact disk (CD), flash memory, and so forth), input/output devices 408 (such as keyboard, cursor control and so forth) and communication interfaces 410 (such as network interface cards, modems and so forth). The elements may be coupled to each other via system bus 412, which may represent one or more buses. In the case where system bus 412 represents multiple buses, the multiple buses may be bridged by one or more bus bridges (not shown).

These elements each perform their conventional functions known in the art. In various embodiments, communication interfaces 410 may facilitate coupling of computing system 400 to a network, though which computing system 400 may be coupled to one or more data processing devices of a data processing environment and so forth, as necessary. In various embodiments, computing system 400 may at least be partially incorporated in such a data processing device. System memory 404 and mass storage 406 may be employed to store a working copy and a permanent copy of the programming instructions, illustrated as Instructions 414 and 416, respectively, for implementing various aspects of the one or more earlier described embodiments of the present disclosure. The permanent copy of the programming instructions may be loaded into mass storage 406 in the factory or in the field, through a distribution medium (not shown), or through communication interface 410 from, for example, a distribution server (not shown). The constitution of these elements 402-412 are known, and accordingly will not be further described. In alternate embodiments, part or all of the one or more modules may be implemented in hardware, for example, using one or more Application Specific Integrated Circuits (ASICs) instead.

In embodiments of the present invention, an article of manufacture (not illustrated) may be employed to implement one or more methods as disclosed herein. For example, in exemplary embodiments, an article of manufacture may comprise a storage medium and a plurality of programming instructions stored on the storage medium, wherein the plurality of instructions are adapted to cause one or more processors within a computing environment to perform a plurality of operations comprising monitoring a virtual infrastructure comprising a plurality of virtual machines and virtual objects, generating an alert for at least one virtual machine and/or object due to an event within the virtual infrastructure, representing the at least one virtual machine and/or object in a scripting format, and executing a script with respect to the at least one virtual machine and/or object to remediate the event that caused the alert. In various embodiments, an article of manufacture may comprise a storage medium and a plurality of programming instructions stored in the storage medium and adapted to program, for example, computing system 400 to configure the computing system 400 to perform one or more operations of the method 300.

While the present invention has been described with respect to VMware®, the present invention is equally applicable to other types of virtualization systems and software and the present invention is not limited in this regard.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

What is claimed is:

1. A method of managing a computer network configured with a virtual infrastructure, the virtual infrastructure comprising one or more first hosts configured to include a plurality of virtual machines and virtual objects and one or more second hosts configured to include a virtual center server and a monitoring component configured to monitor the virtual infrastructure, the first hosts and the second hosts being different physical hosts, the method comprising:
    defining one or more patterns of virtual machine events detectable within at least one of the virtual machines and/or at least one of the virtual objects of the one or more first hosts, the virtual machine events including changes in configuration and conditions of the virtual infrastructure;
    with the virtual center server, detecting a plurality of virtual machine events within one or more of the at least one of the virtual machines and/or the virtual objects and communicating the detected virtual machine events to the monitoring component;
    with the monitoring component, monitoring the virtual infrastructure based on the communicated virtual machine events to detect at least one of the patterns of virtual machine events in the virtual infrastructure;
    correlating at least one of the detected conditions for a first one of the virtual machines or virtual objects to a second one of the virtual machines or objects; and
    if the at least one pattern of virtual machine events is detected for the second one of the virtual machines or objects, generating an alert in response to the detection of the pattern.

2. The method of claim 1, wherein multiple patterns of events are defined relating to multiple virtual machines and multiple virtual objects.

3. The method of claim 1, further comprising generating a flag for at least one virtual machine and/or at least one virtual object that is affected by occurrence of the at least one pattern of virtual machine events.

4. The method of claim 1, further comprising remediating one or more virtual machine events with respect to the affected at least one virtual machine and/or virtual object.

5. The method of claim 4, wherein the remediating is performed automatically.

6. The method of claim 1, wherein multiple virtual machines and/or virtual objects are affected by occurrence of the pattern of virtual machine events and the method further comprises correlating the affected virtual machines and/or the virtual objects.

7. The method of claim 6, further comprising generating a flag for each affected virtual machine and/or virtual object.

8. The method of claim 6, further comprising remediating one or more virtual machine events with respect to the affected virtual machines and/or virtual objects.

9. The method of claim 1, wherein the pattern of events includes at least one or more of the following: configuration change events, virtual machine events, and relationship change events.

10. The method of claim 1, wherein the pattern of events includes at least one or more of the following: event occurrences, configuration changes, and conditions that may cause an alert.

11. The method of claim 1, wherein the pattern of events includes multiple occurrences of an event but not a single occurrence of the event.

12. The method of claim 1, wherein the configuration changes include changes to the security policy of a virtual network.

13. The method of claim 1, wherein the configuration changes include modifications to resource allocations within a resource pool.

14. The method of claim 1, wherein the conditions include at least one or more of the following: detection of snapshots that are older than a predefined threshold, detection of datastores with less than a predefined threshold of free space, or detected failure of a Logical Unit Number path.

15. The method of claim 1, wherein the conditions include detection of a failed vMotion.

16. A system comprising:
    a virtual infrastructure implemented on one or more physical hosts, the virtual infrastructure comprising:
        a virtual control center comprising a component that provides control and intra-partitioning of the physical hosts into the virtual infrastructure, each of the partitioned hosts comprising:
            at least one virtual machine, and
            at least one virtual object,
            wherein the virtual control center is configured to detect virtual machine events in the at least one virtual machine and the at least one virtual object; and
    a component configured to:
        define at least one pattern of multiple virtual machine migration events detectable within the virtual infrastructure,
        monitor the virtual infrastructure by receiving detected virtual machine events from the virtual control center, and
        if the at least one pattern is detected, generate an alert in response to detection of the pattern.

17. The system of claim 16, wherein multiple patterns of virtual machine migration events are defined relating to multiple virtual machines and multiple virtual objects.

18. The system of claim 16, wherein the component is further configured to generate a flag for at least one virtual machine and/or at least one virtual object that is affected by occurrence of the at least one pattern of events.

19. The system of claim 16, wherein the component is further configured to remediate one or more events with respect to the affected at least one virtual machine and/or virtual object.

20. The system of claim 19, wherein the remediating is performed automatically.

21. The system of claim 16, wherein multiple virtual machines and/or virtual objects are affected by occurrence of the pattern of virtual machine migration events and the component is further configured to correlate the affected virtual machines and/or the virtual objects.

22. The system of claim 21, wherein the component is further configured to generate a flag for each affected virtual machine and/or virtual object.

23. The system of claim 21, wherein the component is further configured to remediate one or more events with respect to the affected virtual machines and/or virtual objects.

24. The system of claim 23, wherein the remediating is performed automatically.

25. The system of claim 16, wherein the migration events include the assignment of a host to a cluster of hosts.

26. The system of claim 16, wherein the migration events include the detection of a failed migration event.

27. One or more machine-accessible storage memory storing software instructions that when executed by one or more processors within a computing environment cause the processors to perform a method, the method comprising:
  receiving at least one pattern of events defined by a user or system administrator for a virtual infrastructure relating to at least one virtual machine and/or at least one virtual object implemented on one or more physical hosts in the virtual infrastructure;
  monitoring the virtual infrastructure for the occurrence of the pattern of events;
  if the at least one pattern of events is detected within a first one of the at least one virtual machine or the virtual object, generating an alert for a second affected one of the at least one virtual machine or the virtual object in response to detection of the pattern based on a correlation of the detected pattern of events to a pattern of events for the second affected virtual machine or virtual object;
  remediating one or more events with respect to the first virtual machine or object and the second affected at least one virtual machine and/or virtual object; and
  marshaling the second affected virtual machine or virtual object.

28. The storage memory of claim 27, wherein multiple patterns of events are defined relating to multiple virtual machines and multiple virtual objects.

29. The storage memory of claim 27, wherein the plurality of operations further comprise generating a flag for at least one virtual machine and/or at least one virtual object that is affected by occurrence of the at least one pattern of events.

30. The storage memory of claim 27, wherein the remediating is performed manually.

31. The storage memory of claim 27, wherein the remediating is performed automatically.

32. The storage memory of claim 27, wherein multiple virtual machines and/or virtual objects are affected by occurrence of the pattern of events and the plurality of operations further comprise correlating the affected virtual machines and/or the virtual objects.

33. The storage memory of claim 32, wherein the plurality of operations further comprise generating a flag for each affected virtual machine and/or virtual object.

* * * * *